US010622628B2

(12) United States Patent
Poizeau et al.

(10) Patent No.: US 10,622,628 B2
(45) Date of Patent: Apr. 14, 2020

(54) ELECTRODE COMPRISING HEAVILY-DOPED CERIA

(71) Applicants: SAINT-GOBAIN CERAMICS & PLASTICS, INC., Worcester, MA (US); TRUSTEES OF BOSTON UNIVERSITY, Boston, MA (US)

(72) Inventors: Sophie Marie Claire Poizeau, Boston, MA (US); Deniz Cetin, Allston, MA (US); Srikanth Gopalan, Westborough, MA (US)

(73) Assignees: SAINT-GOBAIN CERAMICS & PLASTICS, INC., Worcester, MA (US); TRUSTEES OF BOSTON UNIVERSITY, Boston, MA (US)

( * ) Notice: Subject to any disclaimer, the term of this patent is extended or adjusted under 35 U.S.C. 154(b) by 255 days.

(21) Appl. No.: 15/605,622

(22) Filed: May 25, 2017

(65) Prior Publication Data
US 2017/0346088 A1    Nov. 30, 2017

Related U.S. Application Data

(60) Provisional application No. 62/341,470, filed on May 25, 2016.

(51) Int. Cl.
*H01M 4/48* (2010.01)
*H01M 4/04* (2006.01)
(Continued)

(52) U.S. Cl.
CPC .............. *H01M 4/48* (2013.01); *C04B 35/01* (2013.01); *C04B 35/50* (2013.01);
(Continued)

(58) Field of Classification Search
CPC .... C04B 2235/3213; C04B 2235/3224; C04B 2235/3227; C04B 2235/3229;
(Continued)

(56) References Cited

U.S. PATENT DOCUMENTS

| 2007/0009784 A1 | 1/2007 | Pal et al. |
| 2012/0064433 A1 | 3/2012 | Park |
| 2014/0377478 A1 | 12/2014 | El Batawi et al. |

FOREIGN PATENT DOCUMENTS

| CN | 101383417 A | 3/2009 |
| CN | 102738492 A | 10/2012 |

(Continued)

OTHER PUBLICATIONS

Kilner et al., "Materials for Intermediate-Temperature Solid-Oxide Fuel Cells," Annual Review of Materials Research, 2014, pp. 365-393, vol. 44.1.

(Continued)

*Primary Examiner* — Lingwen R Zeng
(74) *Attorney, Agent, or Firm* — Abel Schillinger, LLP; Thomas H. Osborn

(57) ABSTRACT

An electrode can include a functional layer having an $Ln_2MO_4$ phase, where Ln is at least one lanthanide optionally doped with a metal and M is at least one 3d transition metal, and a heavily-doped ceria phase. In an embodiment, the ceria phase can be present in the functional layer in an amount of at least 40 vol % based on a total volume of the functional layer absent any porosity. An electrochemical device or a sensor device can include the electrode.

20 Claims, 10 Drawing Sheets

(51) Int. Cl.
| | |
|---|---|
| C04B 35/50 | (2006.01) |
| C04B 35/634 | (2006.01) |
| C04B 35/64 | (2006.01) |
| H01M 4/86 | (2006.01) |
| C04B 35/01 | (2006.01) |
| H01M 4/90 | (2006.01) |
| H01M 4/88 | (2006.01) |
| H01M 8/124 | (2016.01) |

(52) U.S. Cl.
CPC .. *C04B 35/63408* (2013.01); *C04B 35/63416* (2013.01); *C04B 35/63488* (2013.01); *C04B 35/64* (2013.01); *H01M 4/0471* (2013.01); *H01M 4/8621* (2013.01); *H01M 4/8652* (2013.01); *H01M 4/8885* (2013.01); *H01M 4/9025* (2013.01); *H01M 4/9066* (2013.01); C04B 2235/3213 (2013.01); C04B 2235/3224 (2013.01); C04B 2235/3227 (2013.01); C04B 2235/3229 (2013.01); C04B 2235/3279 (2013.01); C04B 2235/604 (2013.01); C04B 2235/6567 (2013.01); C04B 2235/77 (2013.01); C04B 2235/80 (2013.01); C04B 2235/96 (2013.01); C04B 2235/9607 (2013.01); C04B 2237/34 (2013.01); C04B 2237/348 (2013.01); C04B 2237/405 (2013.01); C04B 2237/70 (2013.01); *H01M 2008/1293* (2013.01)

(58) Field of Classification Search
CPC ...... C04B 2235/3279; C04B 2235/604; C04B 2235/6567; C04B 2235/77; C04B 2235/80; C04B 2235/96; C04B 2235/9607; C04B 2237/34; C04B 2237/348; C04B 2237/405; C04B 2237/70; C04B 35/01; C04B 35/50; C04B 35/63408; C04B 35/63416; C04B 35/63488; C04B 35/64; H01M 2008/1293; H01M 4/0471; H01M 4/48; H01M 4/8621; H01M 4/8652; H01M 4/8885; H01M 4/9025; H01M 4/9066
See application file for complete search history.

(56) References Cited

FOREIGN PATENT DOCUMENTS

| JP | 2008-257943 A | 10/2008 |
|---|---|---|
| JP | 2010232135 A | 10/2010 |
| JP | 2011-096645 A | 5/2011 |
| JP | 2013-543835 A | 12/2013 |
| JP | 2014-186818 A | 10/2014 |
| JP | 2014-186941 A | 10/2014 |
| JP | 2015-076129 A | 4/2015 |
| JP | 2015-185321 A | 10/2015 |
| JP | 2016-046110 A | 4/2016 |
| JP | 2016-512916 A | 5/2016 |
| KR | 1020120123639 A | 11/2012 |
| WO | 2015106769 A1 | 7/2015 |

OTHER PUBLICATIONS

Pérez-Coll et al., "Optimization of the interface polarization of the La2NiO4-based cathode working with the CE1-xSmxO2-δ electrolyte system," J. Power Sources, 2008, pp. 151-162, vol. 178.

Laberty et al., "High-Performance Solid Oxide Fuel Cell Cathodes with Lanthanum-Nickelate-Based Composites," Solid State Lett., 2007, vol. 10 No. B1170.

Montenegro-Hernandez et al., Thermal stability of Ln2NiO4 (Ln:La, Pr, Nd) and their chemical compatibility with YSZ and CGO solid electrolytes, Int. J. Hydrogen Energy, 2011, pp. 15704-15713, vol. 36.

Hrovat et al., "Subsolidus phase equilibra in the La2O3,—CeO2—NiO system," Journal of Materials Science Letters, 2000, pp. 233-235, vol. 19.

Cetin et al., "Degradation of La2NiO4 in Sm0.2Ce0.802-La2NiO4 Composites for Solid Oxide Fuel Cell Applications," manuscript in progress.

Zhao, Hui et al., "Ln2MO4 cathode materials for solid oxide fuel cells", Science China Chemistry, 2011, vol. 54, No. 6, pp. 898-910 See pp. 898-901, 907, 908; and table 1.

Hiroaki Tagawa, "Solid Oxide Fuel Cell and Global Environment," Japan, Agne Seifusha Co., Ltd., Jun. 20, 1998, p. 145-148, No Translation Available, Cited in JP Office Action dated May 31, 2019.

JP Office Action dated May 31, 2019 from corresponding JP Application No. 2018-561690, 15 pgs.

K. Huang et al: "Increasing Power Density of LSGM-Based Solid Oxide Fuel Cells Using New Anode Materials," Journal of the Electrochemical Society, vol. 148, No. 7, p. A788-A794, 2001.

J. Wan et al: "Nd2-xLaxNiO4-σ, a mixed ionidelectronic conductor with interstitial oxygen, as a cathode material," Solid State Ionics, North Holland Pub. Company. Amsterdam; NL, NL, vol. 178, No. 3-4, pp. 281-286, 2007.

Z. Gao et al: "A perspective on low-temperature solid oxide fuel cells," Energy & Environmental Science, vol. 9, No. 5, pp. 1602-1644, 2016.

R. Sayers et al: "In situ compatibility studies of lanthanum nickelate with a ceria-based electrolyte for SOFC composite cathodes", Journal of Materials Chemistry, vol. 22, No. 8, p. 3536-3543, 2012.

M. Gong et al: "Properties and performance of La1.6Sr0.4NiO4+σe0.8Sm0.201.9 composite cathodes for Intermediate temperature solid oxide fuel cells," Materials Research Bulletin., vol. 44, No. 8, pp. 1630-1634, 2009.

J. Yang et al: "Preparation and electrochemical properties of strontium doped PrNiO cathode materials for Intermediate-temperature solid oxide fuel cells," International Journal of Hydrogen Energy, Elsevier Science Publishers B.V., Barking, GB, vol. 37, No. 2, pp. 1746-1751, 2012.

Y. Shen et al: "Preparation and electrical properties of Ca-doped La2NiO4+5 cathode materials for IT-SOFC", Physical Chemistry Chemical Physics, vol. 12, No. 45, pp. 15124-15131, 2010.

ELECTRODE COMPRISING HEAVILY-DOPED CERIA

CROSS-REFERENCE TO RELATED APPLICATION(S)

This application claims priority under 35 U.S.C. § 119(e) to U.S. Provisional Patent Application No. 62/341,470, filed May 25, 2016, entitled "ELECTRODE COMPRISING HEAVILY-DOPED CERIA," by Sophie Marie Claire Poizeau et al., which is assigned to the current assignee hereof and incorporated by reference herein in its entirety.

FIELD OF THE DISCLOSURE

The present disclosure relates to electrodes and devices comprising the electrodes.

BACKGROUND

In the context of solid oxide fuel and electrolyzer cells, operating temperatures greater than 700° C. are desirable for the more facile kinetics of the gas reactants and lower resistance of the ionic membrane. High operating temperatures also allow internal reformation of hydrocarbon fuels, which can reduce the system size significantly compared to systems with external reforming. However, the high operating temperatures can reduce electrode performance A need exists for an improved electrode material.

BRIEF DESCRIPTION OF THE DRAWINGS

Embodiments are illustrated by way of example and are not limited in the accompanying figures.

Figure 1:
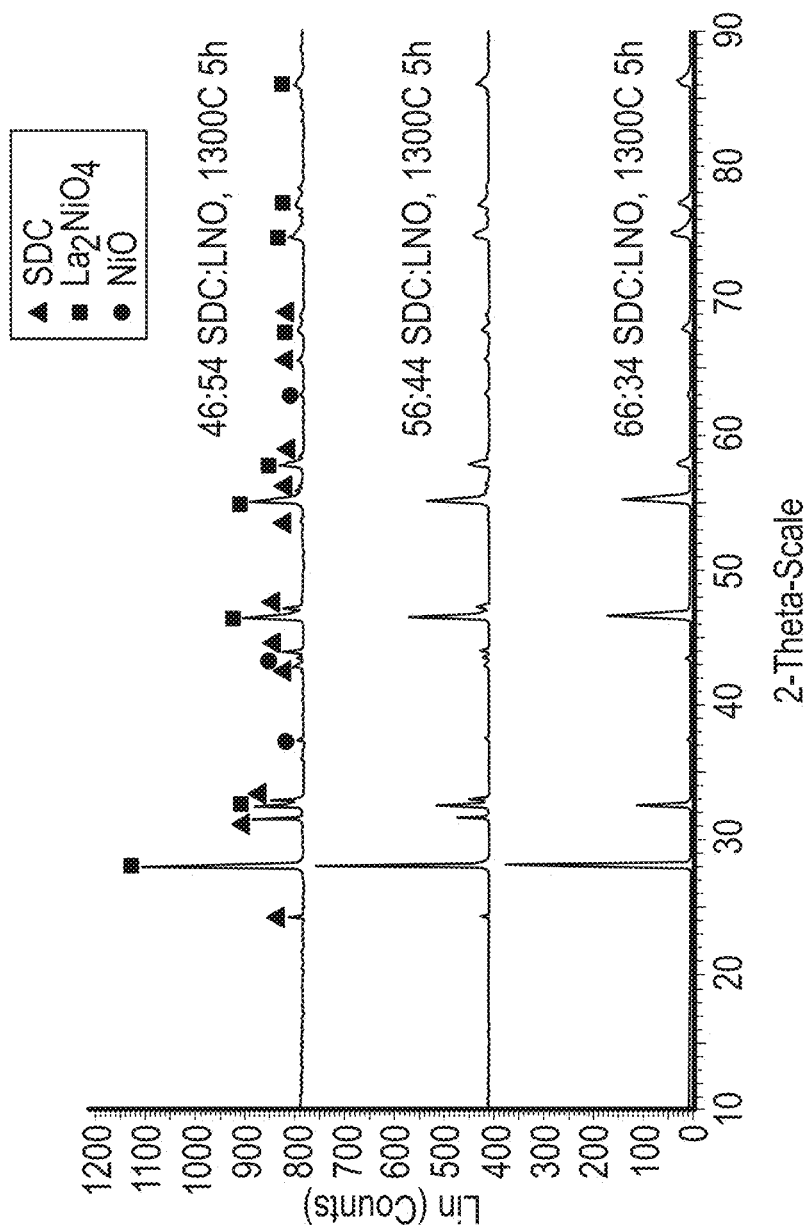
FIGS. 1 to 8 include graphs of XRD patterns for various Samples described in the Examples.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise stated, the term "vol %," when used herein to describe the composition of a layer, refers to a percentage of the total volume of the solids, e.g., excluding porosity, of the layer. Further, unless otherwise stated, the term "mol %," when used herein to describe a dopant concentration, refers to a percentage of the total amount, in moles, of cations in a given compound. Furthermore, the oxygen stoichiometry in any of the formulas provided below may vary slightly and, thus, is considered to include a delta (excess or deficiency), referred to as "d", of +/− 0.5. In particular, a doped ceria ($CeABO_{(2-d)}$) can have oxygen understoichiometry (oxygen deficiency) where d is a deficiency of at most 0.29, at most 0.27, or at most 0.25; and an $Ln_2MO_{4+d}$ can have oxygen overstoichiometry (oxygen excess) where d is an excess of at most 0.34, at most 0.32, or at most 0.3. For example, $La_{0.40}Ce_{0.60}O_2$ would include, e.g., $La_{0.40}Ce_{0.60}O_{2-d}$, where d is at at most 0.25, and $La_2NiO_{4+d}$ would include, e.g., $La_2NiO_{4+d}$, where d is at most 0.3.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the electrochemical arts.

An electrode can include a composite functional layer including a heavily-doped ceria that is suitable for operating temperatures of greater than 700° C. As used herein, the term "heavily-doped" refers to a dopant concentration of at least 40 mol %. In an embodiment, the electrode can include a first phase comprising the heavily-doped ceria and a second phase including an $Ln_2MO_4$ phase, where Ln is at least one lanthanide optionally doped with a metal and M is at least one 3d transition metal, without the reactivity problems encountered with existing composite electrode materials. The concepts are better understood in view of the embodiments described below that illustrate and do not limit the scope of the present invention High temperature electrochemical cells can include a number of requirements for high performance Ideally, the materials should withstand processing temperatures of at least 1000° C. without decomposing or forming resistive phases and maintain a stable composition and crystal structure at operating conditions. In addition, the functional layers should retain porosity and facile electron transfer reaction kinetics.

$Ln_2MO_4$ materials can generally provide high electrode performance, where Ln is any of the lanthanide elements and M is a 3d transition metal. In particular, the $Ln_2MO_4$ family of materials can offer a wider operating temperature range (e.g., 700° C. to 900° C.) as compared to other materials only suitable for either higher or lower temperatures. The $Ln_2MO_4$ family of materials provides the additional advantage of mixed ionic electronic conductivity.

However, the $Ln_2MO_4$ family of materials can be reactive with common high temperature electrolytes. Moreover, $Ln_2MO_4$ materials have a high coefficient of thermal expansion (referred to herein as "CTE"), reducing mechanical stability in a multilayer architecture.

A rare earth-doped ceria can form a composite with the $Ln_2MO_4$ materials to form a composite electrode with a reduced CTE. However, a lightly-doped ceria can react with $Ln_2MO_4$ when in intimate contact at elevated temperatures. As used herein, the term "lightly-doped" refers to a dopant concentration of less than 40 mol %.

Applicants have discovered that an $Ln_2MO_4$:ceria composite including a heavily-doped ceria, especially near the solubility limit of ceria, surprisingly does not exhibit the same reactivity as the lightly-doped ceria. The solubility limit is the amount of rare earth oxide that can be incorporated into the ceria lattice while maintaining its fluorite structure. Further, diffusional transport of the lanthanide element from the $Ln_2MO_4$ into the ceria is suppressed since the dopant concentration is close to the solubility limit of Ln in ceria.

As discussed above, the Ln of the $Ln_2MO_4$ phase includes at least one lanthanide. In an embodiment, the Ln of the $Ln_2MO_4$ phase includes at least one lanthanide selected from the group consisting of La, Sm, Er, Pr, Nd, Gd, Dy, or any combination thereof. Further, the at least one lanthanide or combination thereof can be doped with a metal. The metal dopant can include an alkaline earth metal. In a particular embodiment, the alkaline earth metal can include at least one alkaline earth selected from the group consisting of Sr, Ca, Ba, or any combination thereof to increase hole conductivity.

Further, as discussed above, the M of the $Ln_2MO_4$ phase includes a 3d transition metal. In an embodiment, the M of the $Ln_2MO_4$ phase includes at least one 3d transition metal selected from the group consisting of Ni, Cu, Co, Fe, Mn or any combination thereof.

The heavily-doped ceria phase can include a ceria and at least one dopant such that the total dopant concentration is at least 40 mol % and no greater than the solubility limit of ceria. In an embodiment, the heavily-doped ceria can have the general formula:

$Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than the solubility limit of ceria.

In an embodiment, the rare earth dopant A includes at least one dopant selected from the group consisting of La, Gd, Nd, Sm, Dy, Er, Y, Yb, Ho, or any combination thereof. In a more particular embodiment, the rare earth dopant A includes at least one of La, Gd, Nd, or Sm. In a further embodiment, x+y is at least 0.4, or greater than 0.4, or at least 0.41, or at least 0.42, or at least 0.43, or at least 0.44, or at least 0.45, or at least 0.46, or at least 0.47. It would be expected that the use of heavily-doped ceria for cathode functional layers would lead to lower ionic conductivity. In addition, current literature indicates that electrode performance decreases as x+y increases up to 0.4. See, for example, FIG. 11 of Perez-Coll, et al., "Optimization of the interface polarization of the $La_2NiO_4$-based cathode working with the $Ce_{1-x}Sm_xO_{2-\delta}$ electrolyte system." However, Applicant has discovered that, contrary to Perez-Coll et al., as x+y increases to 40 mol % or greater, even up to the solubility limit of ceria, the more thermodynamically stable the phase is and the diffusion of the lanthanide element from $Ln_2MO_4$ is reduced. That being said, the benefits of increasing the dopant concentration begin to deteriorate beyond the solubility limit of ceria. In further embodiments, x+y is no greater than the solubility limit. In a particular embodiment, x+y is no greater than 0.5.

In an embodiment, the alkaline earth dopant B includes at least one dopant selected from the group consisting of Sr, Ca, Ba, or any combination thereof. In a further embodiment, y can be 0, meaning that the heavily-doped ceria phase does not include an alkaline earth dopant B. In other embodiments, y is at least 0.01, or at least 0.05, or at least 0.1. In other embodiments, y is at most 0.24, or at most 0.22, or at most 0.2.

As mentioned previously, a lightly-doped ceria phase can be reactive with an $Ln_2MO_4$ phase. Such a reaction can cause diffusion of the Ln into the lightly-doped ceria, leading to a reduction or even a complete removal of the Ln from the $Ln_2MO_4$ phase. In addition, such a reaction can lead to the presence of a metal oxide (MO) and/or a free rare earth oxide ($RE_2O_3$), which were not initially present in the electrode, particularly when M is Ni. However, in the composite electrode described herein, the reactivity is reduced or avoided such that, in an embodiment, less than 5 vol % of free $RE_2O_3$ rare earth oxide is detectable in the functional layer of the electrode. In an embodiment, less than 5 vol % of MO metal oxide is detectable in the functional layer of the electrode. The detection method is x-ray diffraction having a detection limit of 5 vol %.

In an embodiment, the ceria phase can be present in the functional layer of the electrode in an amount of at least 40 vol %, or at least 45 vol %, or at least 50 vol %, or at least 55 vol %, or at least 60 vol %, or at least 65 vol %, or at least 70 vol %, or at least 75 vol %, based on a total volume of the functional layer minus the volume occupied by porosity. For a lightly-doped ceria phase, increasing the volume percent of the ceria phase would increase the likelihood of rare earth diffusion. Thus, higher performance for composite electrodes including a lightly-doped ceria phase would be exhibited at lower concentrations of the ceria phase. On the other hand, as the heavily-doped ceria is near the solubility limit of ceria, the thermodynamic stability is increased and, thus, the volume percent of the ceria phase can be increased without increasing the likelihood of rare earth diffusion.

In an embodiment, the functional layer of the electrode has a porosity of at least 10 vol %, or at least 15 vol %, or at least 18 vol %, based on a total volume of the functional layer. Further, in an embodiment, the functional layer of the electrode has a porosity of at most 60 vol %, or at most 50 vol %, or at most 40 vol %, or at most 35 vol %, based on a total volume of the functional layer. The porosity is determined by image analysis of the cross section of the layer using an image analysis tool such as ImageJ to view and measure the porosity by contrast.

In an embodiment, the functional layer of the electrode has the functional layer has a thickness of at least 5 micron, or at least 10 microns, or at least 12 microns, or at least 15 microns, or at least 20 microns. Further, in an embodiment, the functional layer of the electrode has a thickness of at most 100 microns, at most 90 microns, at most 80 microns, or at most 70 microns.

The electrode described herein can be made by providing starter materials, mixing the starter materials, and sintering the mixture. In an embodiment, the starter materials include an $Ln_2MO_4$ material, where Ln is at least one lanthanide optionally doped with a metal and M is at least one 3d transition metal, and a ceria material comprising doped ceria having the general formula $Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than the solubility limit of ceria.

In an embodiment, a binder system can be added to the $Ln_2MO_4$ material and the ceria material to form a slurry. In an embodiment, the binder system can include at least one polymer. The slurry can be deposited by a ceramic forming technique such as spraying, tape casting or screen printing and then sintered to form an electrode having an $Ln_2MO_4$ phase and a ceria phase. The sintering temperature can be greater than the operating temperature. For example, the sintering temperature can be at least 1000° C., or at least 1100° C., or at least 1200° C., or at least 1300° C. In an embodiment, the sintering temperature can be no greater than 1800° C., or no greater than 1700° C., or no greater than 1600° C.

The electrode described herein can be utilized as a component in a variety of devices including electrochemical devices, sensor devices, and the like.

In an embodiment, the electrochemical device including the electrode described herein comprises an electrolyte layer, an optional barrier layer, and an anode layer. The electrolyte layer can comprise at least one electrolyte material selected from the group consisting of ceria, zirconia, lanthanum gallate, or a combination thereof.

In a particular embodiment, the electrolyte material includes a stabilized zirconia.

In a particular embodiment, the electrolyte layer includes a doped ceria having the general formula:
$Ce_{(1-x-y)}A_xB_yO_2$, where A is at least one rare earth dopant, B is at least one alkaline earth dopant, x is at least 0.05, y is in a range of 0 to 0.1, and x+y is greater than 0.05 and less than 0.25. In a particular embodiment, A is La, Gd, Nd, Sm, Dy, Er, Y, Yb, Ho, or any combination thereof. In a particular embodiment, B is Sr, Ca, Ba, or any combination thereof.

The electrolyte layer can have a thickness of at most 800 microns, or at most 600 microns, or at most 400 microns, or at most 200 microns, or at most 50 microns. Further, the electrolyte layer can have a thickness of at least 1 micron, at least 3 microns, or at least 5 microns.

The electrolyte layer can have a porosity of at most 10 vol %, or at most 8 vol %, or at most 6 vol %, or at most 4 vol %, based on a total volume of the electrolyte layer. Further, while the electrolyte may be completely dense, it is possible that some porosity can exist, such as at least 0.01 vol %, or at least 0.05 vol %, or at least 0.1 vol %.

In an embodiment, the electrochemical device includes a barrier layer disposed between the electrode and the electrolyte layer. In a particular embodiment, the barrier layer includes doped ceria having the general formula:
$Ce_{(1-x-y)}A_xB_yO_2$, where A is at least one rare earth dopant, B is at least one alkaline earth dopant, x is at least 0.05, y is in a range of 0 to 0.2, and x+y is greater than 0.05 and no greater than the solubility limit of ceria. In a particular embodiment, A is La, Gd, Nd, Sm, Dy, Er, Y, Yb, Ho, Pr, or any combination thereof. In a particular embodiment, B is Sr, Ca, Ba, or any combination thereof.

In an embodiment, the barrier layer has a porosity of at most 15 vol %, or at most 12 vol %, or at most 10 vol %, based on a total volume of the barrier layer. In an embodiment, the barrier layer has a porosity of at least 0.5 vol %, or at least 1 vol %, or at least 2 vol %, or at least 3 vol %, based on a total volume of the barrier layer.

In an embodiment, the barrier layer has a thickness less than the electrolyte layer and the functional layer.

In a particular embodiment, the electrochemical device includes a solid oxide fuel cell (also referred to as "SOFC"), a solid oxide electrolyzer cell (also referred to as "SOEC"), or a reversible SOFC-SOEC. In a particular embodiment, electrode can be an oxygen electrode.

Moreover, the device can be a sensor device comprising the electrode described herein. In a particular embodiment, the sensor device is an amperometric sensor. In another embodiment, the sensor device is a potentiometric sensor.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as embodiments below.

Embodiment 1. An electrode comprising:
a functional layer comprising an $Ln_2MO_4$ phase, where Ln is at least one lanthanide optionally doped with a metal and M is at least one 3d transition metal;
the functional layer further comprising a ceria phase comprising doped ceria having the general formula $Ce_{(1-x-y)}A_xB_yO_2$, where A is at least one rare earth dopant, B is at least one alkaline earth dopant, x is greater than 0.2, y is in a range of 0 to 0.2, and x+y is greater than 0.4 and no greater than the solubility limit of ceria.

Embodiment 2. An electrode comprising:
a functional layer comprising an $Ln_2MO_4$ phase, where Ln is at least one lanthanide optionally doped with a metal and M is at least one 3d transition metal;
the functional layer further comprising a ceria phase comprising doped ceria having the general formula $Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than the solubility limit of ceria.
wherein at least one lanthanide of the $Ln_2MO_4$ phase is the same as at least one rare earth dopant of the ceria phase.

Embodiment 3. An electrode comprising:
a functional layer comprising an $Ln_2MO_4$ phase, where Ln is at least one lanthanide optionally doped with a metal and M is at least one 3d transition metal;
the functional layer further comprising a ceria phase comprising doped ceria having the general formula $Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than the solubility limit of ceria.
wherein the ceria phase is present in the functional layer in an amount of at least 40 vol % based on a total volume of the functional layer absent any porosity.

Embodiment 4. A method of Forming an Electrode, Comprising:
providing an Ln2MO4 material, where Ln is at least one lanthanide optionally doped with a metal and M is at least one 3d transition metal;
providing a ceria material comprising doped ceria having the general formula $Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than the solubility limit of ceria;

mixing the $Ln_2MO_4$ material and the ceria material to form a mixture; and sintering the mixture at a temperature that is at least 1000° C. and greater than the operating temperature to form a functional layer of the oxygen electrode having an $Ln_2MO_4$ phase and a ceria phase.

Embodiment 5. The method of embodiment 4, wherein the sintering temperature is at least 1100° C., or at least 1200° C., or at least 1300° C.

Embodiment 6. The electrode or method of any one of the preceding embodiments, wherein the lanthanide of the $Ln_2MO_4$ phase includes at least one of La, Sm, Er, Pr, Nd, Gd, Dy or any combination thereof.

Embodiment 7. The electrode or method of any one of the preceding embodiments, wherein the lanthanide of the $Ln_2MO_4$ phase is doped with an alkaline earth metal.

Embodiment 8. The electrode or method of any one of the preceding embodiments, wherein the lanthanide of the $Ln_2MO_4$ phase is doped with an alkaline earth metal including at least one of Sr, Ca, Ba, or any combination thereof.

Embodiment 9. The electrode or method of any one of the preceding embodiments, wherein the 3d transition metal of the $Ln_2MO_4$ phase includes at least one of Ni, Cu, Co, Fe, Mn or any combination thereof.

Embodiment 10. The electrode or method of any one of the preceding embodiments, wherein A is La, Gd, Nd, Sm, Dy, Er, Y, Yb, Ho, or any combination thereof.

Embodiment 11. The electrode or method of any one of the preceding embodiments, wherein x+y is at least 0.41, or at least 0.42, or at least 0.43, or at least 0.44, or at least 0.45, or at least 0.46, or at least 0.47.

Embodiment 12. The electrode or method of any one of the preceding embodiments, wherein x+y is at most 0.5.

Embodiment 13. The electrode or method of any one of the preceding embodiments, wherein less than 5 vol % free rare earth oxide is detectable in the functional layer.

Embodiment 14. The electrode or method of any one of the preceding embodiments, wherein less than 5 vol % of 3d transition metal oxide is detectable in the functional layer.

Embodiment 15. The electrode or method of any one of the preceding embodiments, wherein the ceria phase is present in the functional layer in an amount of at least 40 vol %, or at least 45 vol %, or at least 50 vol %, or at least 55 vol %, or at least 60 vol %, or at least 65 vol %, or at least 70 vol %, or at least 75 vol %, based on a total volume of the functional layer minus porosity.

Embodiment 16. The electrode or method of any one of the preceding embodiments, wherein the functional layer has a porosity of at least 10 vol %, or at least 15 vol %, or at least 18 vol %, based on a total volume of the functional layer.

Embodiment 17. The electrode or method of any one of the preceding embodiments, wherein the functional layer has an porosity of at most 60 vol %, or at most 50 vol %, or at most 40 vol %, or at most 35 vol %, based on a total volume of the functional layer.

Embodiment 18. The electrode or method of any one of the preceding embodiments, wherein the functional layer has a thickness of at least 5 micron, or at least 10 microns, or at least 12 microns, or at least 15 microns, or at least 20 microns.

Embodiment 19. The electrode or method of any one of the preceding embodiments, wherein the functional layer has a thickness of at most 100 microns, at most 90 microns, at most 80 microns, or at most 70 microns.

Embodiment 20. The electrode or method of any one of the preceding embodiments, wherein the functional layer includes the $Ln_2MO_4$ phase in an initial composition.

Embodiment 21. An electrochemical device comprising the electrode of any one of the preceding embodiments.

Embodiment 22. The electrochemical device of embodiment 21, wherein the electrochemical device is an SOFC, an SOEC, or a reversible SOFC-SOEC.

Embodiment 23. The electrochemical device of any one of embodiments 21 and 22, further comprising an electrolyte layer.

Embodiment 24. The electrochemical device of embodiment 23, wherein the electrolyte layer has a thickness of at most 800 microns, or at most 600 microns, or at most 400 microns, or at most 200 microns, or at most 50 microns.

Embodiment 25. The electrochemical device of any one of embodiments 23 and 24, wherein the electrolyte layer has a porosity of at most 10 vol %, or at most 8 vol %, or at most 6 vol %, or at most 4 vol %, based on a total volume of the electrolyte layer.

Embodiment 26. The electrochemical device of any one of embodiments 23 to 25, wherein the electrolyte layer comprises at least one of ceria, zirconia, lanthanum gallate or a combination thereof.

Embodiment 27. The electrochemical device of embodiment 26, wherein the electrolyte layer includes a doped ceria having the general formula Ce(1-x-y)AxByO2, where A is at least one rare earth dopant, B is at least one alkaline earth dopant, x is at least 0.05, y is in a range of 0 to 0.1, and x+y is greater than 0 and less than 0.25.

Embodiment 28. The electrochemical device of embodiment 26, wherein the electrolyte layer includes a stabilized zirconia.

Embodiment 29. The electrochemical device of embodiment 28, further comprising a barrier layer disposed between the functional layer and the electrolyte layer.

Embodiment 30. The electrochemical device of embodiment 29, wherein the barrier layer includes doped ceria having the general formula Ce(1-x-y)AxByO2, where A is at least one rare earth dopant, B is at least one alkaline earth dopant, x is at least 0.05, y is in a range of 0 to 0.2, and x+y is greater than 0.05 and no greater than the solubility limit of ceria.

Embodiment 31. The electrochemical device of embodiment 30, wherein A is La, Gd, Nd, Sm, Dy, Er, Y, Yb, Ho, Pr, or any combination thereof.

Embodiment 32. The electrochemical device of any one of embodiments 29 to 31, wherein the barrier layer has a porosity of at most 15 vol %, or at most 12 vol %, or at most 10 vol %.

Embodiment 33. The electrochemical device of any one of embodiments 29 to 32, wherein the barrier layer has a thickness less than the electrolyte layer and the functional layer.

Embodiment 34. The electrochemical device of any one of embodiments 22 to 33, wherein the electrochemical device is a solid oxide fuel cell and the electrode is an oxygen electrode.

Embodiment 35. The electrochemical device of embodiment 34, wherein the fuel electrode comprises a Ni-YSZ anode electrode.

Embodiment 36. The electrochemical device of any one of embodiments 22 to 33, wherein the electrochemical device is a solid oxide electrolyzer cell and the electrode is an anode electrode.

Embodiment 37. A sensor device comprising the electrode of any one of embodiments 1 to 20.

Embodiment 38. The sensor device of embodiment 37, wherein the sensor device is an amperometric sensor.

Embodiment 39. The sensor device of embodiment 37, wherein the sensor device is a potentiometric sensor.

EXAMPLES

Example 1

Coefficient of Thermal Expansion

The CTE of various samples were measured.

For Sample 1, SDC:LNO mixtures were mixed poly (ethylene glycol) 400 and poly(vinyl alcohol) 205 as a binder system to form a slurry. Each sample was prepared with 0.6 g of the slurry pressed at room temperature in a 6 mm diameter cylinder. After sintering, they were heated up to 1200° C. and back down to room temperature at 2° C./min to measure the CTE. The CTE reported in Table 1 is the value over the cooling down cycle in the range of 1200° C. to 100° C. The CTE of LNO-SDC mixtures described in Table 1 is low enough to be used for SOFC cathodes with YSZ as the electrolyte. For Sample 1, the initial composition included SDC as $Sm_{0.2}Ce_{0.8}O_2$ and LNO as $La_2NiO_4$.

TABLE 1

|  | LNO | LNO-SDC 64:36 vol % | LNO-SDC 54:46 vol % | LNO-SDC 44:56 vol % | LNO-SDC 34:66 vol % | SDC |
|---|---|---|---|---|---|---|
| CTE (ppm/K) | 14.1 ± 0.1 | 13.4 ± 0.2 | 13.4 ± 0.1 | 12.6 ± 0.2 | 12.1 ± 0.1 | 12.6 ± 0.1 |

Sample 2 was prepared identically to Sample 1 except SDC was replaced with LDC40, where the initial composition included LDC40 as $La_{0.40}Ce_{0.60}O_2$ and LNO as $La_2NiO_4$. The results for Sample 2 are provided in Table 2.

TABLE 2

|  | LNO | LNO-LDC40 54:46 vol % | LNO-LDC40 44:56 vol % | LNO-LDC40 34:66 vol % | LNO-LDC40 23:77 vol % | LDC40 |
|---|---|---|---|---|---|---|
| CTE (ppm/K) | 14.1 ± 0.1 | 12.7 ± 0.2 | 12.3 ± 0.1 | 12.1 ± 0.1 | 12.1 ± 0.1 | 11.3 |

Advantageously, the use of heavily-doped ceria lowers the CTE of the LNO phase, similar to Sample 1. However, unlike Sample 1, the CTE values for heavily-doped ceria in Sample 2 follow here the rule of mixture, which further indicates that the phases for Sample 2 are thermodynamically stable.

Example 2

X-Ray Diffraction

Sample 3 included SDC-LNO compositions at 46:54 vol % SDC:LNO, 56:44 vol % SDC:LNO, and 66:34 vol % SDC:LNO, each after annealing at 1300° C. for 5 hrs. The initial composition for Sample 3 included a lightly-doped SDC phase ($Sm_{0.2}Ce_{0.8}O_2$), and an LNO phase ($La_2NiO_4$). The X-ray diffraction (XRD) patterns for Sample 3 are provided in the graph of FIG. 1. In the case of the 66:34 vol % SDC:LNO mixture, the amount of La incorporated in the ceria lattice could be estimated, by measuring lattice parameters from XRD patterns, as $Sm_{0.2}La_{0.23}Ce_{0.57}O_{2-\delta}$. Because of the adsorption of $La_2O_3$ in the ceria lattice, LNO is $La_2O_3$ depleted, which leads to its decomposition and the formation of NiO.

Figure 2:
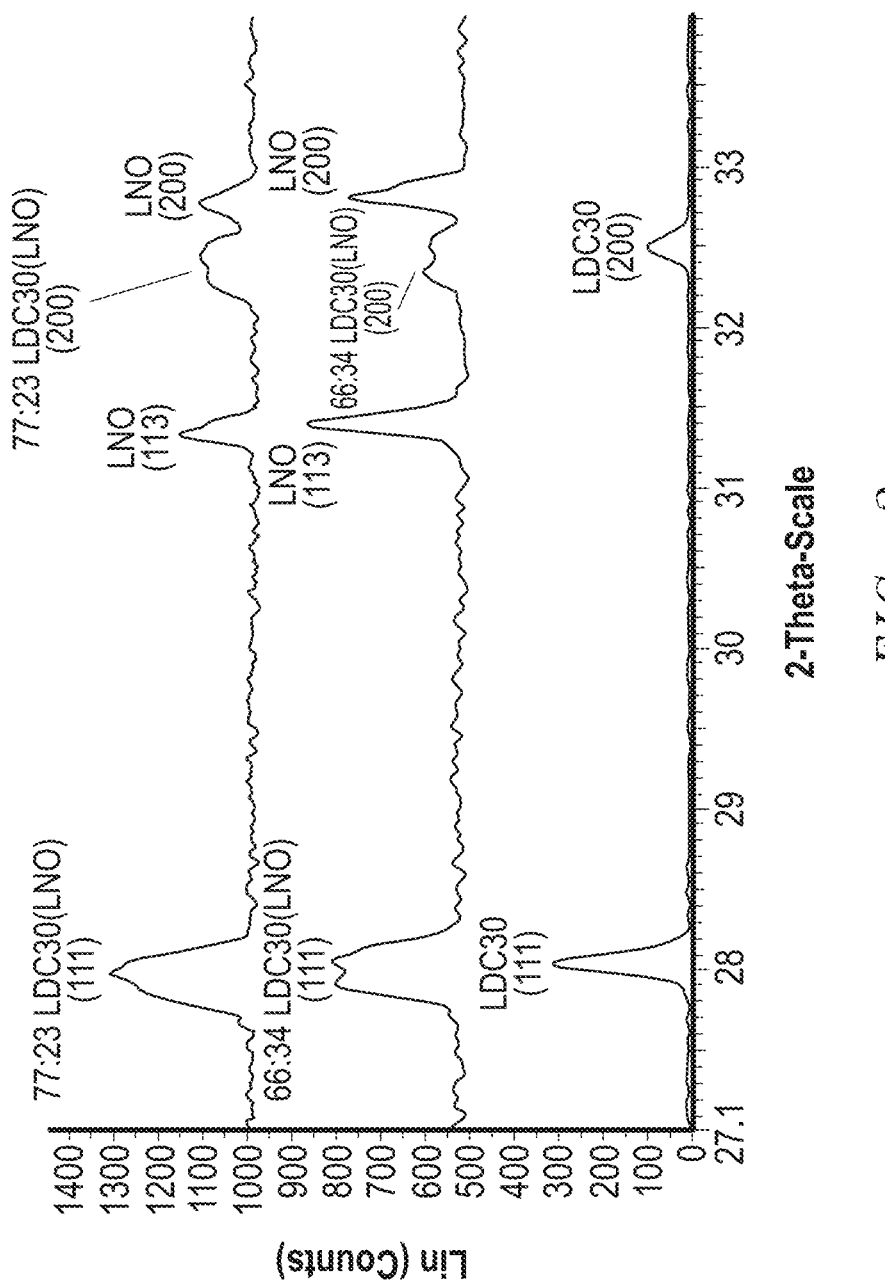

Sample 4 included LDC30-LNO compositions at 77:23 vol % LDC30:LNO, 66:34 vol % LDC30:LNO, and 100:0 vol % LDC30:LNO, each after annealing at 1300° C. for 5 hrs. The initial composition for Sample 4 included LDC30 as $La_{0.30}Ce_{0.70}O_2$ and LNO as $La_2NiO_4$. The XRD patterns for Sample 4 are provided in the graph of FIG. 2, and shows that the peaks (more specifically (111) and (200)) of the lightly-doped ceria, which had been introduced as single-phase ceria, were split. This was not desirable as it indicated significant diffusion of $La_2O_3$ from the LNO phase into the LDC lattice, meaning that the LNO phase is decomposed.

However, when LDC (lanthanum-doped ceria) was introduced with a concentration of dopant at or above 40 vol %, and below the solubility limit of ceria, around 50 mol %, the peaks of doped ceria are not split, as it can be seen below in the case of 40 mol % (Sample 5 and 6 below), and 48 mol % (Sample 7 below). The closer the dopant concentration was to the solubility limit, the results were more desirable, as the XRD patterns indicated the composite was more thermodynamically stable.

Figure 3:
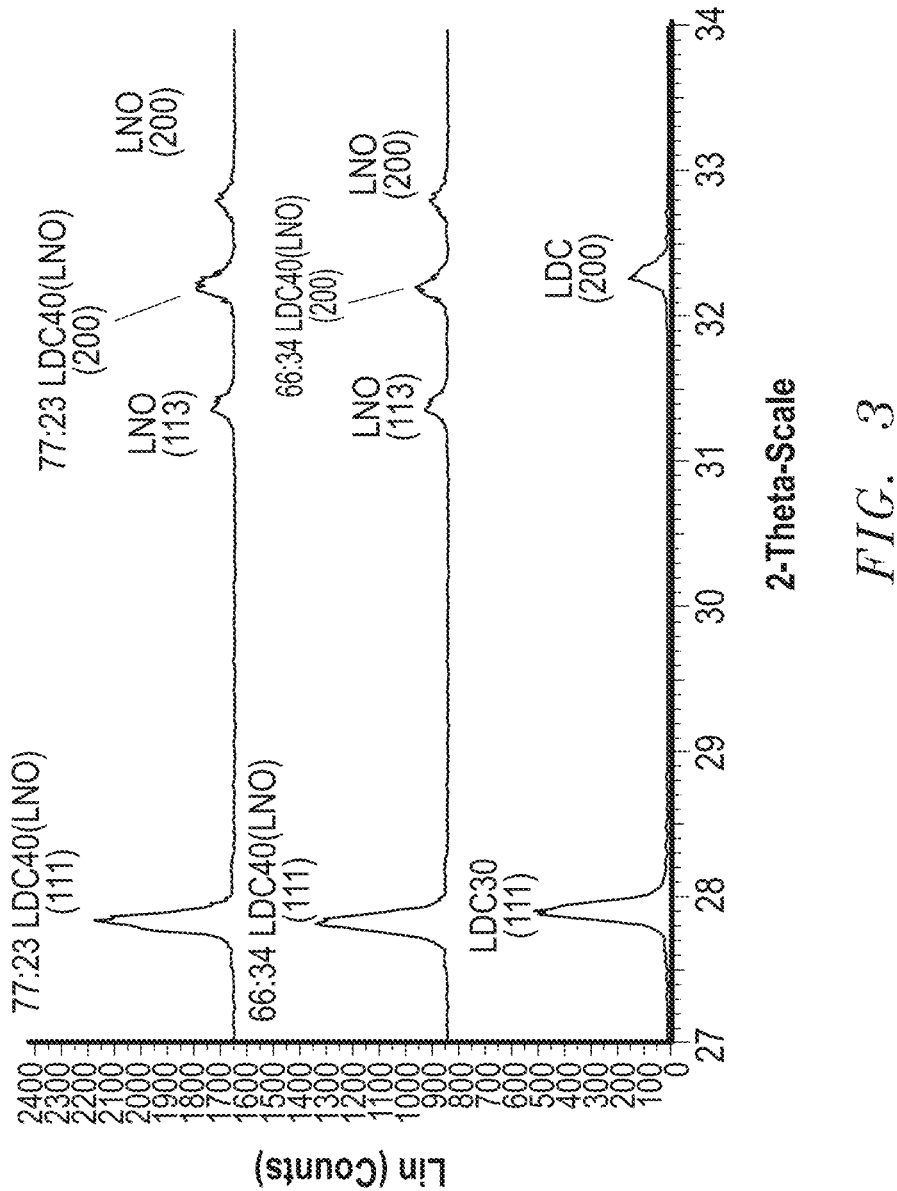

Sample 5 included LDC40-LNO compositions at 77:23 vol % LDC40:LNO, 66:34 vol % LDC40:LNO, and 100:0 vol % LDC40:LNO, each after annealing at 1300° C. for 5 hrs. The initial composition for Sample 5 included LDC40 as $La_{0.40}Ce_{0.60}O_2$ and LNO as $La_2NiO_4$. The XRD patterns for Sample 5 are provided in the graph of FIG. 3, showing there is no split peak.

Figure 4:
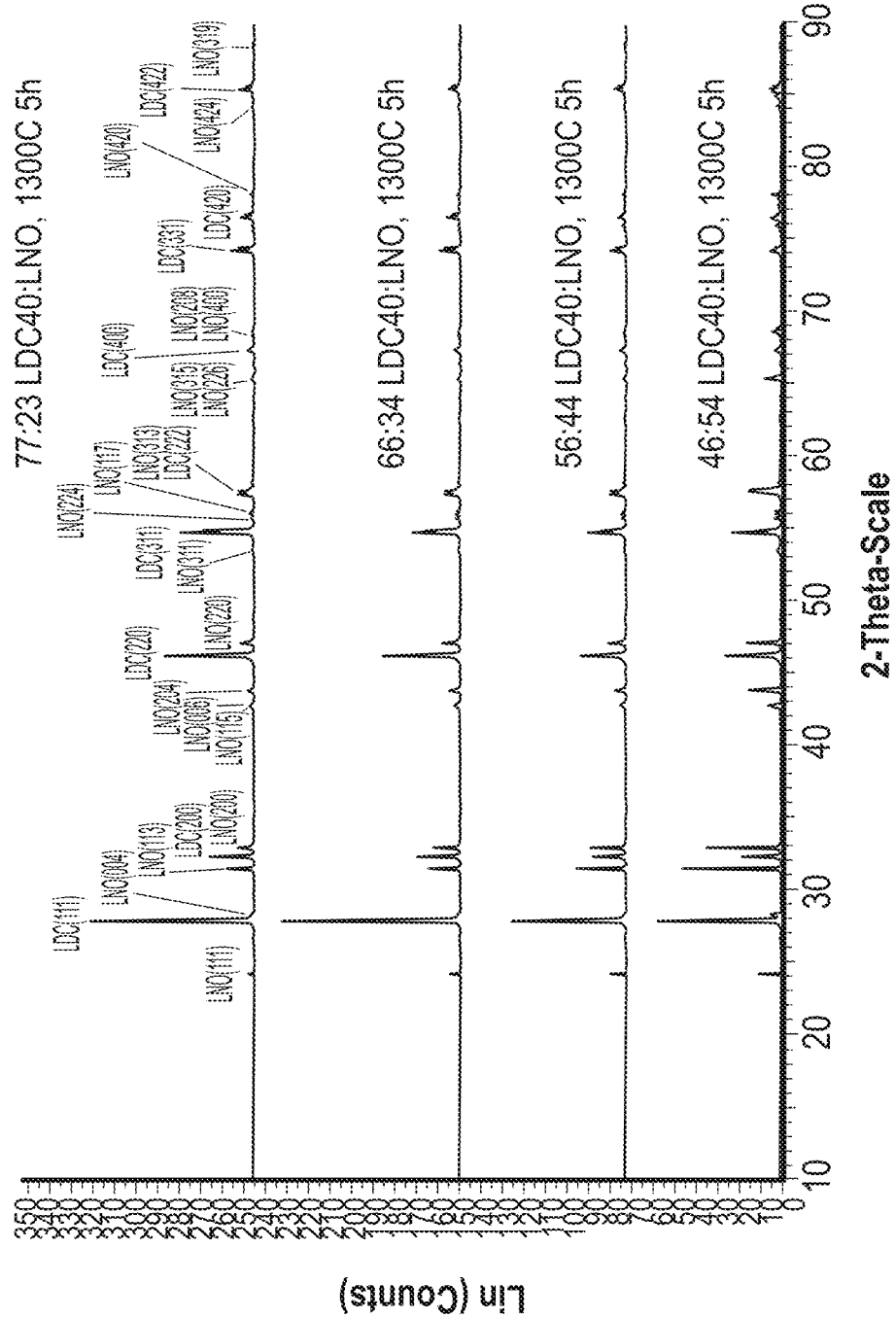

Sample 6 is similar to Sample 5 except that it included LDC40-LNO compositions at 77:23 vol % LDC40:LNO, 66:34 vol % LDC40:LNO, 56:44 vol % LDC40:LNO, and 46:54 vol % LDC40:LNO. Like Sample 5, the initial composition for Sample 6 included LDC40 as $La_{0.40}Ce_{0.60}O_2$ and LNO as $La_2NiO_4$. The XRD patterns for Sample 6 are provided in the graph of FIG. 4, and are measured at a scale sufficient to show there was no extra peak indicating any decomposition of LNO or formation of NiO.

Figure 5:
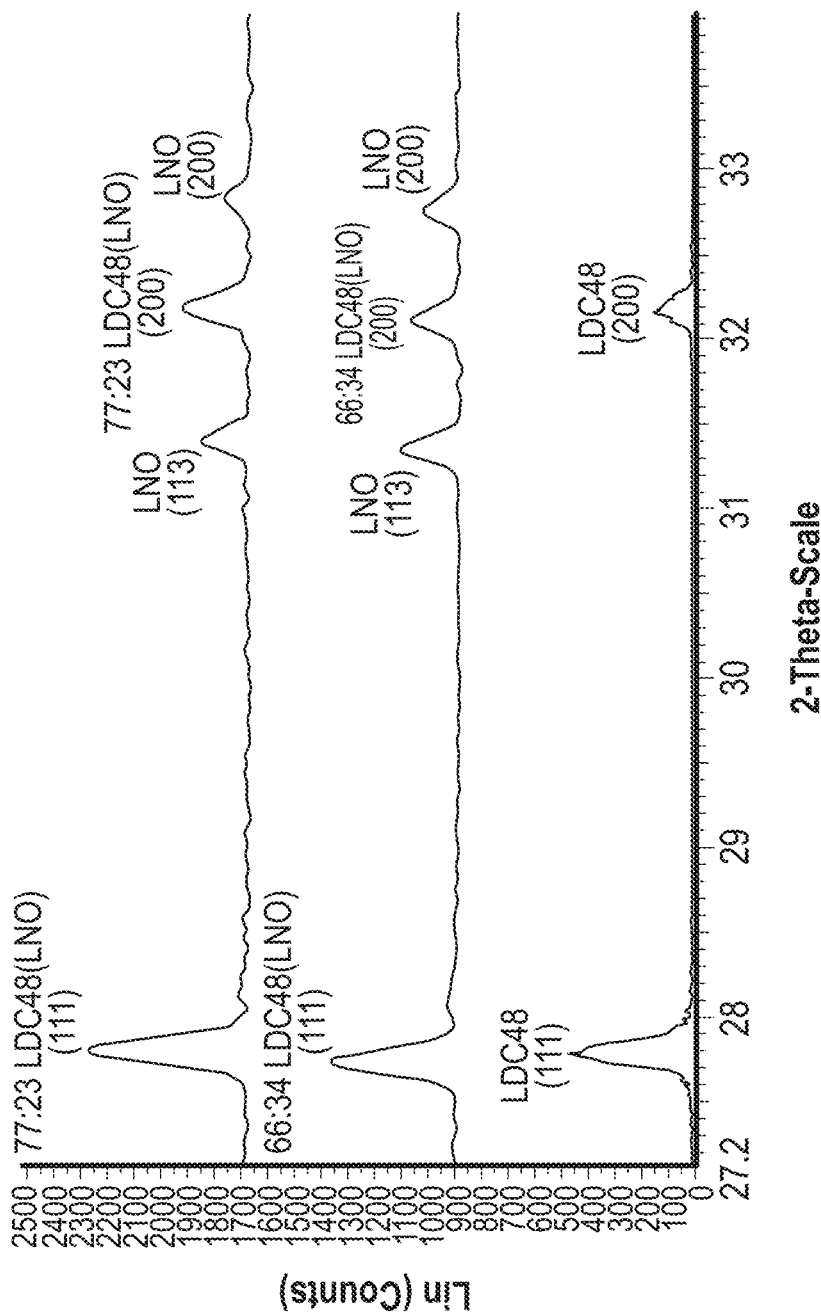

Sample 7 included LDC48-LNO compositions at 77:23 vol % LDC48:LNO, 66:34 vol % LDC48:LNO, and 100:0 vol % LDC48:LNO, each after annealing at 1300° C. for 5 hrs. The initial composition of Sample 7 includes LDC48 as $La_{0.48}Ce_{0.52}O_2$ and LNO as $La_2NiO_4$. The XRD patterns are provided in the graph of FIG. 5.

Samples 8, 9 and 10 below showed the stability of NNO and LSNO phases in the presence of a heavily-doped ceria phase.

Figure 6:
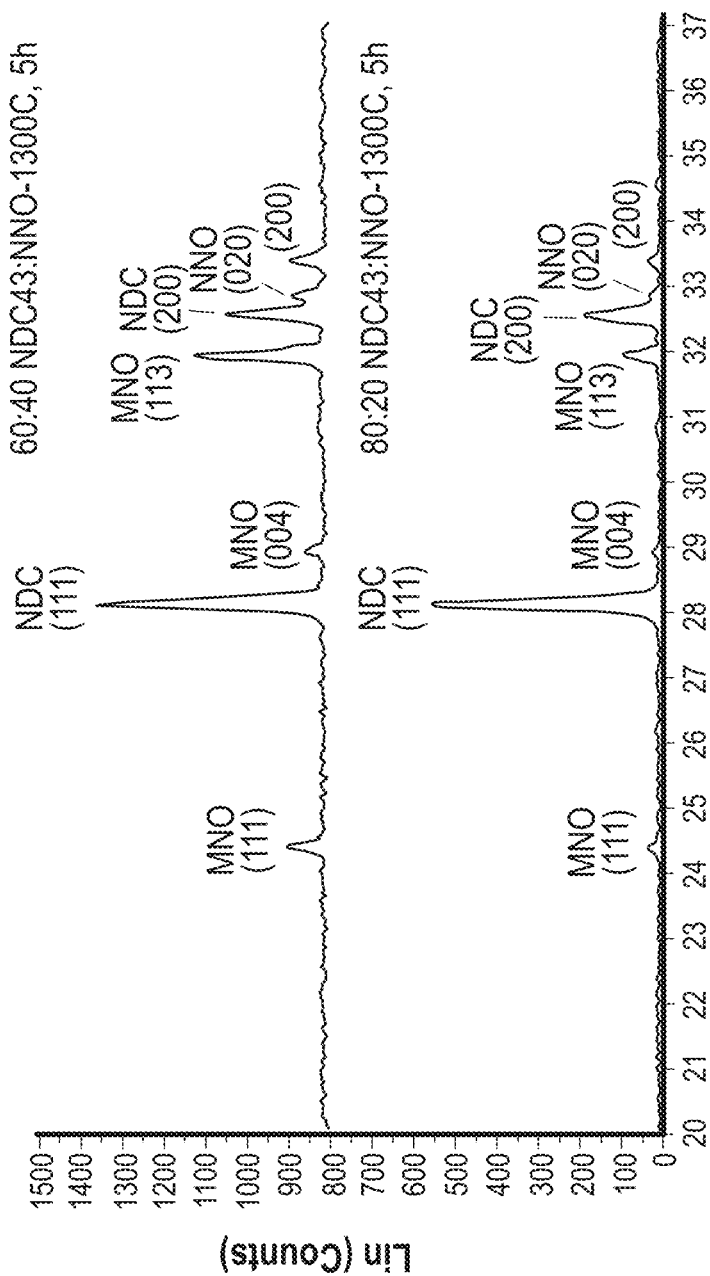

Sample 8 included NDC43-NNO compositions at 60:40 vol % NDC43:NNO and 80:20 vol % NDC43:NNO, each after annealing at 1300° C. for 5 hrs. The initial composition of Sample 8 included NDC43 as $Nd_{0.43}Ce_{0.57}O_2$ and NNO as $Nd_2NiO_4$. The X-ray diffraction results are provided in the graph of FIG. 6, and show the stability of NNO even in low NNO volume fractions, using a composite having a heavily-doped ceria phase.

Figure 7:
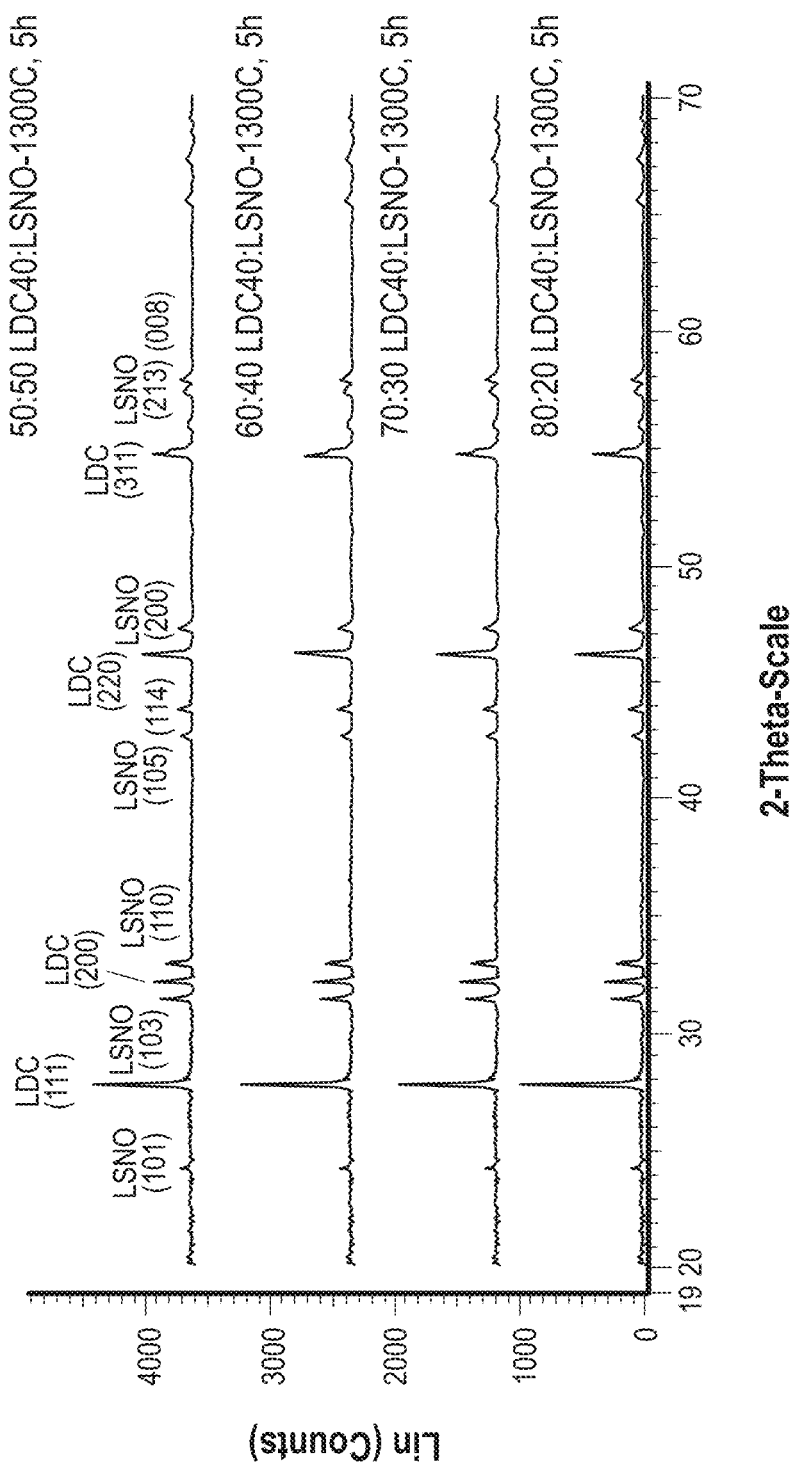

Sample 9 included LDC40-LSNO compositions at 50:50 vol % LDC40:LSNO, 60:40 vol % LDC40:LSNO, 70:30 vol % LDC40:LSNO, and 80:20 vol % LDC40:LSNO, each after annealing at 1300° C. for 5 hrs. The initial composition of Sample 9 included LDC40 as $La_{0.40}Ce_{0.60}O_2$ and LSNO as $La_{1.8}Sr_{0.2}NiO_4$. The X-ray diffraction patterns are provided in the graph of FIG. 7, and show the stability of LSNO, even in low LSNO volume fractions, using a composite having a heavily-doped ceria phase.

Figure 8:
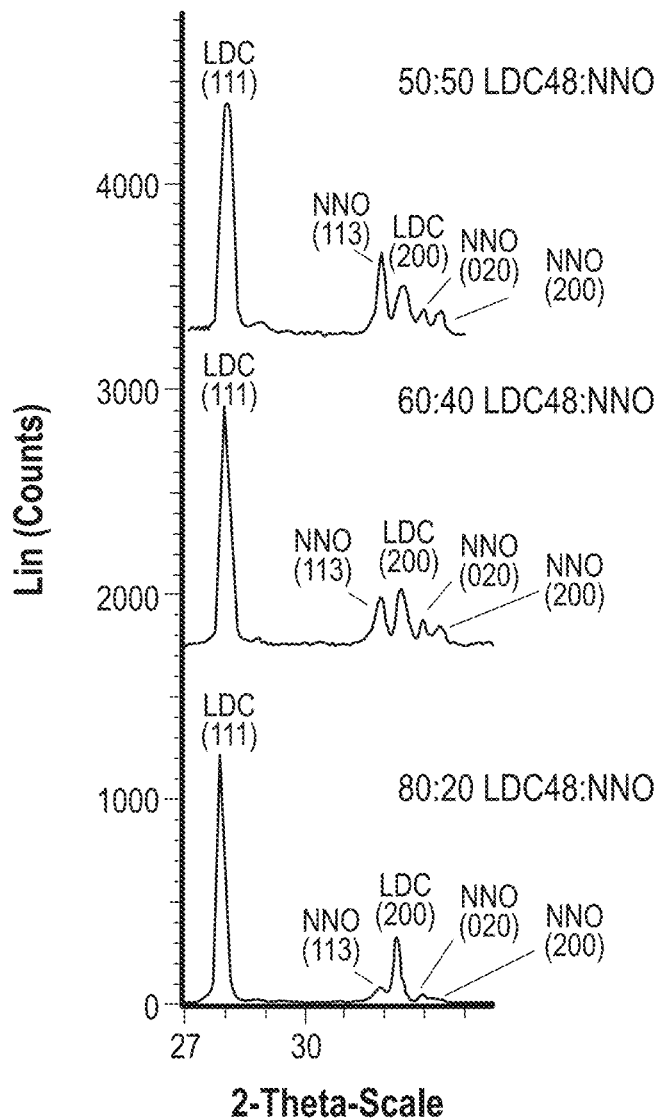

Sample 10 included LDC48-NNO compositions at 50:50 vol % LDC48:NNO, 60:40 vol % LDC48:NNO, and 80:20 vol % LDC48:NNO, each after annealing at 1300° C. for 5 hrs. The initial composition for Sample 10 included LDC48 as $La_{0.48}Ce_{0.52}O_2$ and NNO as $Nd_2NiO_4$. The X-ray diffraction patterns are provided in the graph of FIG. 8, and show the stability of NNO, even in low NNO volume fractions, using a composite having a heavily-doped ceria phase with a different rare earth dopant.

For each of Samples 3 to 10, the densities listed in Table 3 were calculated based on XRD patterns of the single phase materials, and used in the calculations for the vol % of the different mixtures.

TABLE 3

| Crystal structure | Material | Molar weight (g/mol) | Density (g/ml) |
|---|---|---|---|
| orthorhombic | $Nd_2NiO_4$ | 411.75 | 7.4 |
| tetragonal | $La_2NiO_4$ | 400.5 | 7.11 |
| FCC | $Nd_{0.43}Ce_{0.55}O_2$ | 173.89 | 6.82 |
| FCC | $La_{0.30}Ce_{0.70}O_2$ | 171.76 | 6.74 |
| FCC | $La_{0.40}Ce_{0.60}O_2$ | 171.63 | 6.59 |
| FCC | $La_{0.48}Ce_{0.52}O_2$ | 171.54 | 6.48 |
| tetragonal | $La_{1.8}Sr_{0.2}NiO_4$ | 390.25 | 6.92 |

Example 3

SOFC Button Cell

Figure 9:
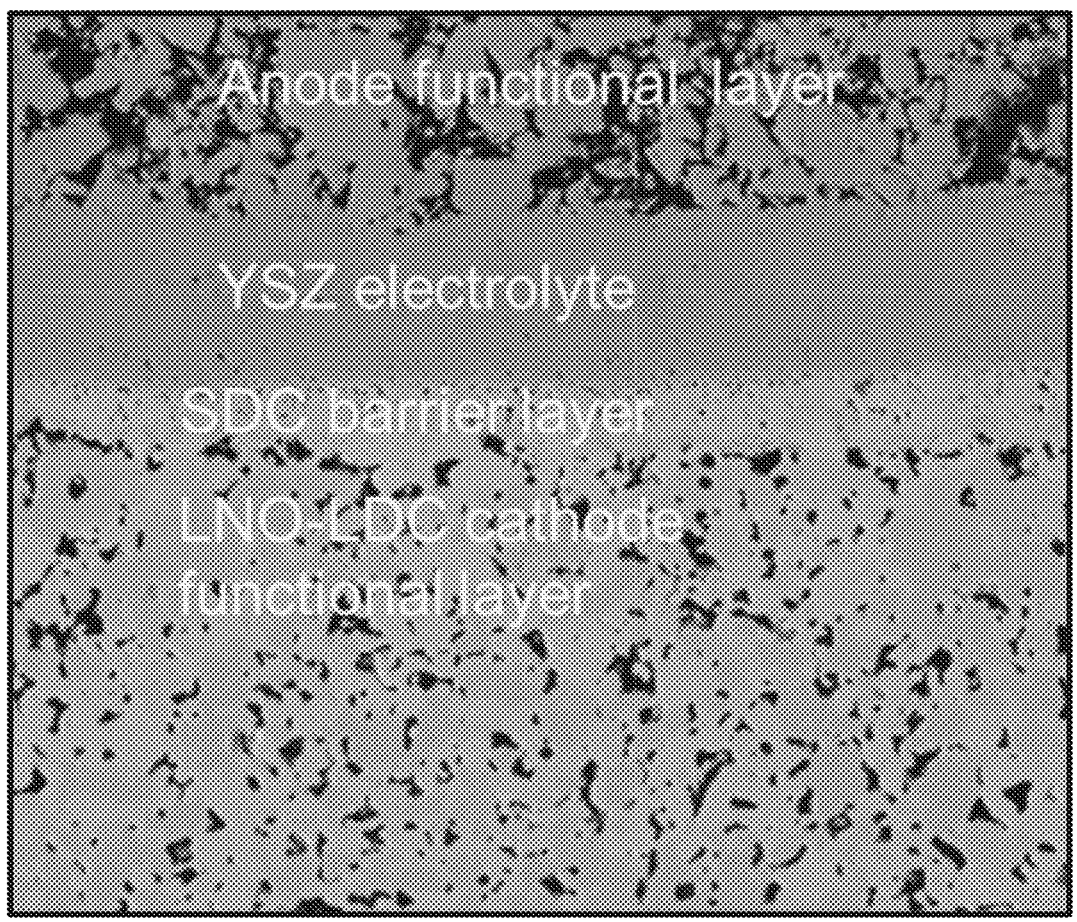
FIG. 9 includes a photograph of an SOFC button cell described in the Examples.
Figure 10:
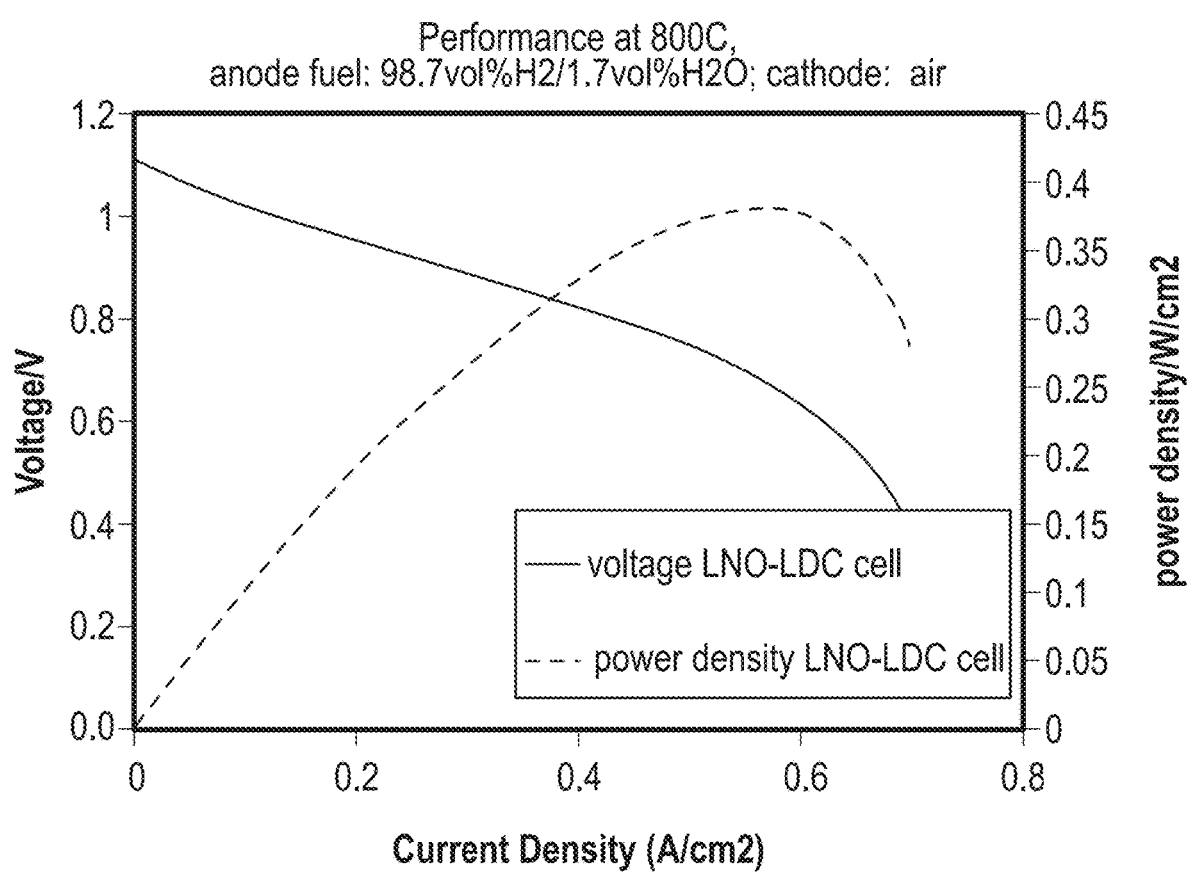
FIG. 10 includes a graph of performance characteristics of the SOFC button cell of FIG. 9.

A solid oxide fuel cell was prepared using a Ni-YSZ anode, YSZ electrolyte, SDC barrier layer, and LNO-LDC40 cathode functional layer. The thickness of the LNO-LDC40 cathode functional layer was about 20 to 30 μm. The porosity of the cathode functional layer was about 15%. In addition, a substantially dense SDC barrier layer was placed between the YSZ electrolyte and the functional layer to avoid the formation of any insulating phase between the electrolyte and the cathode functional layer. The thickness of the SDC barrier layer was about 3 μm and its porosity was about 3%. An SEM image of the multilayer fuel cell is provided in FIG. 8 and the performance characteristics of the SOFC button cell demonstrating high performance are provided in the graph of FIG. 9.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrode comprising:
    a functional layer comprising an $Ln_2MO_4$ phase, where Ln is at least one lanthanide optionally doped with a metal and M is at least one 3d transition metal;
    the functional layer further comprising a ceria phase comprising doped ceria having a general formula $Ce_{(1-x-y)}A_xB_yO_2$, where A is at least one rare earth dopant, B is at least one alkaline earth dopant, x is greater than 0.2, y is in a range of 0 to 0.2, and x+y is greater than 0.4 and no greater than a solubility limit of ceria.

2. The electrode of claim 1, wherein the lanthanide of the $Ln_2MO_4$ phase is doped with an alkaline earth metal.

3. An electrode comprising:
    a functional layer comprising an $Ln_2MO_4$ phase, where Ln is at least one lanthanide optionally doped with a metal and M is at least one 3d transition metal;
    the functional layer further comprising a ceria phase comprising doped ceria having a general formula $Ce_{(1-x-y)}A_xB_yO_2$, where A is at least one rare earth dopant, B is at least one alkaline earth dopant, x is at least 0.2, y is in a range of 0 to 0.2, and x+y is at least 0.4 and no greater than a solubility limit of ceria,
    wherein the ceria phase is present in the functional layer in an amount of at least 40 vol % based on a total volume of the functional layer absent any porosity.

4. The electrode of claim 3, wherein the lanthanide of the $Ln_2MO_4$ phase is doped with an alkaline earth metal.

5. The electrode of claim 1, wherein x+y is at least 0.43.

6. The electrode of claim 1, wherein x+y is at least 0.45.

7. The electrode of claim 5, wherein the ceria phase is present in the functional layer in an amount of at least 40 vol %, based on a total volume of the functional layer minus porosity.

8. The electrode of claim 1, wherein the at least one 3d transition metal includes Ni, Cu, Co, Fe, Mn, or any combination thereof.

9. A sensor device comprising the electrode of claim 1.

10. An electrochemical device comprising the electrode of claim 1.

11. The electrode of claim 3, wherein the ceria phase is present in the functional layer in an amount of at least 45 vol % based on a total volume of the functional layer minus porosity.

12. The electrode of claim 3, wherein at least one lanthanide of the $Ln_2MO_4$ phase is same as at least one rare earth dopant of the ceria phase.

13. The electrode of claim 3, wherein x+y is at least 0.45.

14. An electrochemical device comprising the electrode of claim 3.

15. The electrochemical device of claim 14, further comprising an electrolyte layer overlying the electrode, wherein the electrolyte layer comprises ceria, zirconia, lanthanum gallate, or a combination thereof.

16. The electrochemical device of claim 14, further comprising an electrolyte layer comprising a stabilized zirconia and a barrier layer disposed between the functional layer and the electrolyte layer.

17. The electrochemical device of claim 16, wherein the barrier layer includes doped ceria having the general formula $Ce_{(1-x-y)}A_xB_yO_2$, where A is at least one rare earth dopant, B is at least one alkaline earth dopant, x is at least 0.05, y is in a range of 0 to 0.2, and x+y is greater than 0.05 and no greater than a solubility limit of ceria.

18. An electrode comprising:
 a functional layer comprising an $Ln_2MO_4$ phase, where Ln is at least one lanthanide optionally doped with a metal and M is at least one 3d transition metal;
 the functional layer further comprising a ceria phase comprising doped ceria having a general formula $Ce_{(1-x-y)}A_xB_yO_2$, where A is at least one rare earth dopant including La, Er, Pr, Nd, Gd, Dy, or a combination thereof, B is at least one alkaline earth dopant, x is greater than 0.2, y is in a range of 0 to 0.2, and x+y is at least 0.4 and no greater than a solubility limit of ceria.

19. The electrode of claim 18, wherein the ceria phase is present in the functional layer in an amount of at least 40 vol % based on a total volume of the functional layer minus any porosity.

20. The electrode of claim 18, wherein A includes La, Nd, or a combination thereof.

* * * * *